US012562378B2

(12) United States Patent
Li

(10) Patent No.: US 12,562,378 B2
(45) Date of Patent: Feb. 24, 2026

(54) ELECTROCHEMICAL APPARATUS AND ELECTRONIC APPARATUS

(71) Applicant: Ningde Amperex Technology Limited, Ningde (CN)

(72) Inventor: Xin Li, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 640 days.

(21) Appl. No.: 17/708,375

(22) Filed: Mar. 30, 2022

(65) Prior Publication Data

US 2022/0320501 A1     Oct. 6, 2022

Related U.S. Application Data

(63) Continuation of application No. PCT/CN2021/084082, filed on Mar. 30, 2021.

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/133* (2013.01); *H01M 4/134* (2013.01); *H01M 4/364* (2013.01);
(Continued)

(58) Field of Classification Search
CPC ...... H01M 4/366; H01M 4/133; H01M 4/134; H01M 4/364; H01M 4/382; H01M 4/483;
(Continued)

(56) References Cited

U.S. PATENT DOCUMENTS

| | | | |
|---|---|---|---|
| 2010/0285360 A1* | 11/2010 | Kozinsky ................ | H01M 4/38 |
| | | | 429/231.95 |
| 2011/0111294 A1* | 5/2011 | Lopez ................... | H01M 4/525 |
| | | | 977/773 |

(Continued)

FOREIGN PATENT DOCUMENTS

| | | |
|---|---|---|
| CN | 101047244 A | 10/2007 |
| CN | 102299338 A | 12/2011 |

(Continued)

OTHER PUBLICATIONS

Extended European Search Report for EP Application No. 21815094.4, dated 12.08.2022.

(Continued)

*Primary Examiner* — Eugenia Wang
(74) *Attorney, Agent, or Firm* — XSENSUS LLP

(57) ABSTRACT

An electrochemical apparatus includes a positive electrode plate and a negative electrode plate, the negative electrode plate includes a negative electrode current collector and a negative electrode active substance layer disposed on a surface of the negative electrode current collector; the negative electrode active substance layer includes an active material layer and a lithium-containing layer provided on a surface of the active material layer; and the active material layer includes a SiOC material and graphite. The negative electrode material provided in this application can improve the first-cycle coulombic efficiency and energy density of the electrochemical apparatus.

19 Claims, 2 Drawing Sheets

(51) Int. Cl.

| | |
|---|---|
| *H01M 4/133* | (2010.01) |
| *H01M 4/134* | (2010.01) |
| *H01M 4/38* | (2006.01) |
| *H01M 4/48* | (2010.01) |
| *H01M 4/58* | (2010.01) |
| *H01M 4/587* | (2010.01) |
| *H01M 10/0525* | (2010.01) |
| *H01M 10/0568* | (2010.01) |
| *H01M 10/0569* | (2010.01) |

(52) U.S. Cl.
CPC .......... *H01M 4/382* (2013.01); *H01M 4/483* (2013.01); *H01M 4/5825* (2013.01); *H01M 4/587* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 2300/0028* (2013.01)

(58) Field of Classification Search
CPC .... H01M 4/5825; H01M 4/587; H01M 4/405; H01M 4/48; H01M 10/0525; H01M 2004/021; H01M 2004/027
See application file for complete search history.

(56) References Cited

U.S. PATENT DOCUMENTS

| | | | |
|---|---|---|---|
| 2015/0010826 A1* | 1/2015 | Wietelmann .......... | H01M 4/366 429/231.95 |
| 2017/0040613 A1* | 2/2017 | Masuda ................ | H01M 4/624 |
| 2019/0207209 A1 | 7/2019 | Venkatachalam et al. | |
| 2020/0365893 A1* | 11/2020 | Zhu ....................... | H01M 4/136 |

FOREIGN PATENT DOCUMENTS

| | | | |
|---|---|---|---|
| CN | 102299338 B | 6/2014 | |
| CN | 105742613 A | 7/2016 | |
| CN | 107431196 A | 12/2017 | |
| CN | 110088945 A | 8/2019 | |
| CN | 110416523 A | 11/2019 | |
| JP | 2005063805 A | 3/2005 | |
| JP | 2006062949 A | 3/2006 | |
| JP | 2007294422 A | 11/2007 | |
| JP | 2008098151 A | 4/2008 | |
| JP | 2020191188 A | 11/2020 | |
| WO | WO-2019107336 A1 * | 6/2019 | .......... C01B 32/956 |

OTHER PUBLICATIONS

Liao Ningbo et al. "Lithiation Behavior of High Capacity SiCO Anode Material for Lithium-ion Battery: A First Principle Study", Electrochimica ACTA, Elsevier, Amsterdam, NL, vol. 156, Jan. 13, 2015, pp. 115-120, XP029200699, figs 6, 8a, conclusions.
First Office Action of JP application No. 2021-539131, dated Jun. 20, 2023.
Second Office Action of JP application No. 2021-539131, dated Nov. 14, 2023.
ISR for International Application PCT/CN2021/084082 mailed Dec. 30, 2021.
Written Opinion for International Application PCT/CN2021/084082 mailed Dec. 30, 2021.

* cited by examiner

ELECTROCHEMICAL APPARATUS AND ELECTRONIC APPARATUS

CROSS-REFERENCE TO RELATED APPLICATION

This application is a continuation of International Patent Application No. PCT/CN2021/084082, filed on Mar. 30, 2021, the disclosure of which is hereby incorporated by reference in its entirety.

TECHNICAL FIELD

This application relates to the field of energy storage technologies, and specifically, to an electrochemical apparatus and an electronic apparatus.

BACKGROUND

Currently, silicon-based negative electrode materials with high gram capacity are considered as the most promising next-generation lithium-ion negative electrode materials. However, silicon has low conductivity ($>10^8$ $\Omega \cdot$cm), and during charging/discharging, has a volume swelling of about 300% and produces an unstable solid electrolyte interphase (SEI) film. The silicon negative electrode material is pulverized and falls off a current collector during charging/discharging, such that electrical contact is lost between an active material and the current collector, leading to degraded electrochemical performance, capacity fading, and poorer cycling stability, which to some extent hinders further application of the silicon-based negative electrode material. Currently, a method of improving electrochemical performance of the silicon materials is combining silicon and carbon materials. The SiOC material has attracted attention from the market due to its smallest volume swelling. However, the SiOC material achieves lithium storage by breaking the Si—O bond, which creates an irreversible compound, $LiSiO_4$, such that the first-cycle coulombic efficiency of the SiOC material is low, and the energy density of the electrochemical apparatus is reduced.

SUMMARY

In view of this, this application provides an electrochemical apparatus and an electronic apparatus, which can improve the first-cycle coulombic efficiency and energy density of the electrochemical apparatus.

According to a first aspect, this application provides an electrochemical apparatus, including a positive electrode plate and a negative electrode plate, where the negative electrode plate includes a negative electrode current collector and a negative electrode active substance layer disposed on a surface of the negative electrode current collector; the negative electrode active substance layer includes an active material layer and a lithium-containing layer provided on a surface of the active material layer; and the active material layer includes a SiOC material and graphite.

In some feasible implementations, the lithium-containing layer includes stabilized lithium metal powder.

In some feasible implementations, the electrochemical apparatus satisfies at least one of the following characteristics (1) to (4):

(1) in Si2p spectrum obtained by analyzing the negative electrode active substance layer according to an X-ray diffraction method, a binding energy peak of Si2p includes at least one of 101.4 eV±0.3 eV, 102.2 eV±0.3 eV, 103.1 eV±0.3 eV, or 104.40 eV±0.3 eV;

(2) a binding energy peak of Li obtained by analyzing the negative electrode active substance layer according to the X-ray diffraction method is 55.6 eV±0.3 eV;

(3) by analyzing the negative electrode active substance layer according to the X-ray diffraction method, the negative electrode active substance layer has at least one of a $Li_{22}Si$ diffraction peak, a $Li_{22}Ge$ diffraction peak, a $Li_{22}Sn$ diffraction peak, a $Li_2O$ diffraction peak, a $Li_2SiO_3$ diffraction peak, or a $Li_2Si_2O_5$ diffraction peak; or (4) chemical shift values of Si obtained by analyzing the negative electrode active substance layer according to a solid-state nuclear magnetic resonance technology include −5 ppm±1 ppm, −35 ppm±1 ppm, −75 ppm±1 ppm, and −100 ppm±1 ppm, and a peak width K at half height of the chemical shift peak of Si at −5 ppm±1 ppm satisfies the following relationship: 7 ppm<K<28 ppm.

In some feasible implementations, the electrochemical apparatus satisfies at least one of the following characteristics (5) to (9):

(5) a median particle size of the mixed powder of the SiOC material and graphite is $R_1$ um, and an $R_1$ value ranges from 0.01 to 50;

(6) a median particle size of the stabilized lithium metal powder is $R_2$ um, and an $R_2$ value ranges from 0.1 to 20;

(7) a thickness of the active material layer is $D_1$ um, and a $D_1$ value ranges from 40 to 150;

(8) a thickness of the lithium-containing layer is $D_2$ um, and a $D_2$ value ranges from 2 to 20; or (9) when the electrochemical apparatus is in a fully charged state, the negative electrode active substance layer has a diffraction peak of $Li_{15}Si_4$ according to the X-ray diffraction method.

In some feasible implementations, the electrochemical apparatus satisfies at least one of the following characteristics (10) to (11):

(10) a ratio of a median particle size $R_2$ of the stabilized lithium metal powder to a median particle size $R_1$ of the mixed powder satisfies: $0.01 \leq R_2/R_1 \leq 1$; or

(11) a ratio of a thickness $D_1$ of the active material layer to a thickness $D_2$ of the lithium-containing layer satisfies: $2 \leq D_1/D_2 \leq 20$.

In some feasible implementations, the electrochemical apparatus satisfies at least one of the following characteristics (12) to (14):

(12) a mass ratio of the SiOC material to the graphite ranges from 5:95 to 45:55;

(13) a mass ratio of total mass of the SiOC material and the graphite to mass of the stabilized lithium metal powder ranges from 1.99 to 9; or

(14) the graphite includes at least one of natural graphite, artificial graphite, or meso-carbon microbeads.

In some feasible implementations, the electrochemical apparatus satisfies at least one of the following characteristics (15) and (16):

(15) a powder electrical conductivity of the negative electrode active substance layer ranges from 2.0 S/cm to 30.0 S/cm; or

(16) a resistance of the negative electrode active substance layer ranges from 0.2Ω to 1.0Ω.

In some feasible implementations, the negative electrode active substance layer further includes a binder; and the binder includes at least one of polyacrylate, polyimide, polyamide, polyamideimide, polyfluoroethylene, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, or potassium hydroxymethyl cellulose.

In some feasible implementations, the electrochemical apparatus further includes an electrolyte, and the electrolyte includes an organic solvent and a lithium salt;

the organic solvent includes at least one of ethylene carbonate, propylene carbonate, diethyl carbonate, ethyl methyl carbonate, dimethyl carbonate, propylene carbonate, propyl propionate, or ethyl propionate; and/or the lithium salt includes at least one of lithium hexafluorophosphate, lithium tetrafluoroborate, lithium difluorophosphate, lithium bistrifluoromethanesulfonimide, lithium bis(fluorosulfonyl)imide, lithium bis(oxalate) borate, or lithium difluorooxalate.

According to a second aspect, this application further provides an electronic apparatus, where the electronic apparatus includes the electrochemical apparatus according to the first aspect.

Compared with the prior art, this application has at least the following beneficial effects:

In the electrochemical apparatus provided in this application, the SiOC material in the active material layer and the stabilized lithium metal powder in the lithium-containing layer can be activated by contact with the electrolyte, to provide more active lithium ions for the electrochemical apparatus to make up for the active lithium ions consumed after the irreversible lithium storage in the SiOC material, thereby improving the first-cycle coulombic efficiency of the negative electrode material and increasing the energy density of the battery.

DETAILED DESCRIPTION

Figure 1:
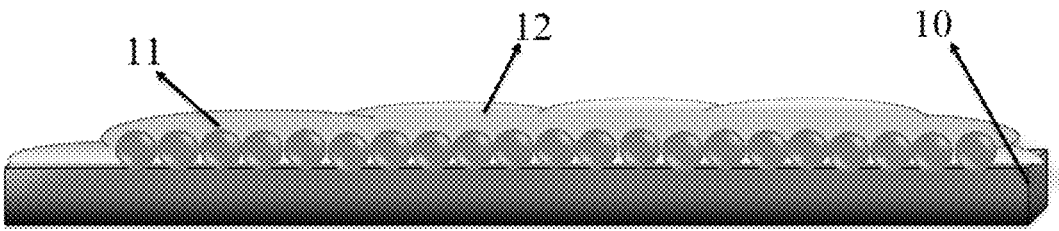
FIG. 1 is a schematic structural diagram of a negative electrode plate according to an embodiment of this application.

The following descriptions are preferred implementations of the embodiments of this application. It should be noted that a person of ordinary skill in the art may make several improvements or modifications without departing from the principle of the embodiments of this application, and the improvements or modifications shall fall within the protection scope of the embodiments of this application.

For simplicity, only some numerical ranges are explicitly disclosed in this specification. However, any lower limit may be combined with any upper limit to form an unspecified range, any lower limit may be combined with another lower limit to form an unspecified range, and similarly, any upper limit may be combined with any other upper limit to form an unspecified range. In addition, although not explicitly stated, each point or a single numerical value between end points of a range is included in the range. Therefore, each point or a single numerical value may serve as its own lower limit or upper limit and be combined with any other point or single numerical value or another lower limit or upper limit to form an unspecified range.

In the description of this specification, it should be noted that, unless otherwise stated, "more than" and "less than" a number means inclusion of the number itself, and "more" in "one or more" means at least two.

The foregoing summary of this application is not intended to describe each disclosed embodiment or each implementation of this application. The following descriptions illustrate example embodiments more specifically by using examples. In many places throughout this application, guidance is provided through a series of embodiments. These embodiments may be used in various combinations. In each embodiment, enumeration is only representative but should not be interpreted as exhaustive.

According to a first aspect, this application provides an electrochemical apparatus, including a positive electrode plate and a negative electrode plate, where the positive electrode plate includes a positive electrode current collector and a positive electrode active substance layer disposed on a surface of the positive electrode current collector; and the negative electrode plate includes a negative electrode current collector and a negative electrode active substance layer disposed on a surface of the negative electrode current collector; and the negative electrode active substance layer includes an active material layer and a lithium-containing layer provided on a surface of the active material layer; and the active material includes a SiOC material and graphite.

In this application, the SiOC material in the active material layer and the stabilized lithium metal powder in the lithium-containing layer can be activated by contact with the electrolyte, to provide more active lithium ions for the electrochemical apparatus to make up for the active lithium ions consumed after the irreversible lithium storage in the SiOC material, thereby improving the first-cycle coulombic efficiency of the negative electrode material and increasing the energy density of the battery.

In an optional technical solution of this application, the SiOC material and graphite are mixed well to form the active material.

The SiOC material mainly includes a Si—O—C framework and free carbons, where the Si—O—C framework is connected to the free carbons by C—Si bonds. The Si—O—C framework can be regarded as $SiO_4$ tetrahedron with O substituted by C. Therefore, the SiOC material may be present in four forms: $SiO_2C_2$, $SiO_3C$, $SiOC_3$, and $SiO_4$, where $SiO_2C_2$, and $SiO_3C$ are forms for completely reversible lithium storage, $SiOC_3$ is a form for irreversible lithium storage, $SiOC_3$ is changed to $SiC_4$ after lithium storage; and $SiO_4$ is a form for partially reversible lithium storage, and $SiO_4$ is changed to reversible $Li_2SiO_5$ and irreversible $LiSiO_4$ after lithium storage. The irreversible $LiSiO_4$ consumes some active lithium ions in the electrochemical apparatus. However, the SiOC material has excellent resistance to damage by external force, and can produce a rich nanoporous structure during pyrolysis to improve the toughness of the material.

In an optional technical solution of this application, the SiOC material includes, but is not limited to: crystalline carbon, amorphous carbon, and combinations thereof. The forms of the crystalline SiOC material may be amorphous, lamellar, flaky, spherical, square, nanoparticle, or fibrous.

In an optional technical solution of this application, a mass ratio of the SiOC material to the graphite ranges from 5:95 to 45:55, specifically may be 5:95, 10:90, 15:85, 45:55, or the like, and certainly may be another value within the foregoing range, which is not limited herein. In this application, the graphite may include at least one of natural graphite, artificial graphite, or meso-carbon microbeads, and it is only required to mix the graphite and the SiOC material well.

In an optional technical solution of this application, a mass ratio of the active material to the stabilized lithium metal powder ranges from 1.99 to 9, specifically may be 1.99, 2.5, 3.0, 4.5, 5.0, 5.8, 6.7, 8.0, 9, or the like, and certainly, may be another value within the foregoing range, which is not limited herein.

As shown in FIG. 1, an active material layer 11 is provided on a surface of a negative electrode current collector 10, a lithium-containing layer 12 is provided on a surface of the active material layer 11, and the lithium-containing layer 12 includes stabilized lithium metal powder.

In an optional technical solution of this application, the negative electrode current collector includes, but is not limited to: copper foil, nickel foil, stainless steel foil, titanium foil, foamed nickel, foamed copper, or a polymer base coated with conductive metal. Preferably, the negative electrode current collector is copper foil.

A thickness of the active material layer 11 is $D_1$ um, and a value of $D_1$ ranges from 40 to 150; and specifically, the thickness of the active material layer 11 may be 40 um, 50 um, 60 um, 80 um, 100 um, 120 um, 150 um, or the like, and certainly may be another value within the foregoing range, which is not limited herein.

A thickness of the lithium-containing layer 12 is $D_2$ um, and a value of $D_2$ ranges from 2 to 20; and specifically, the thickness of the lithium-containing layer 12 may be 2 um, 4 um, 5 um, 6 um, 8 um, 10 um, 12 um, 15 um, 18 um, 20 um, or the like, and certainly may be another value within the foregoing range, which is not limited herein.

A ratio of the thickness $D_1$ of the active material layer 11 to the thickness $D_2$ of the lithium-containing layer satisfies: $2 \leq D_1/D_2 \leq 20$. A value of $D_1/D_2$ may specifically be 2, 4, 5, 8, 10, 12, 15, 18, 20, or the like, and certainly may be another value within the foregoing range, which is not limited herein.

In an optional technical solution of this application, the stabilized lithium metal powder may be stabilized metal lithium powder and/or stabilized metal lithium compound, and specifically, the stabilized lithium metal powder includes element Li, element Ge, element Sn, or the like.

In an optional technical solution of this application, the negative electrode active substance layer is analyzed according to an X-ray diffraction method, and the negative electrode active substance layer has at least one of a $Li_{22}Si$ diffraction peak, a $Li_{22}Ge$ diffraction peak, a $Li_{22}Sn$ diffraction peak, a $Li_2O$ diffraction peak, a $Li_2SiO_3$ diffraction peak, or a $Li_2Si_2O_5$ diffraction peak.

In an optional technical solution of this application, a median particle size of the active material is $R_1$ um, and a value of $R_1$ ranges from 0.01 to 50; and specifically, the median particle size of the active material may be 0.01 um, 0.05 um, 0.1 um, 0.5 um, 1 um, 5 um, 10 um, 20 um, 30 um, 40 um, 50 um, or the like, and certainly may be another value within the foregoing range, which is not limited herein.

In an optional technical solution of this application, a median particle size of the stabilized lithium metal powder is $R_2$ um, and a value of $R_2$ ranges from 0.1 to 20; and specifically, the median particle size of the active material may be 0.1 um, 0.5 um, 1 um, 3 um, 5 um, 8 um, 10 um, 15 um, 18 um, 20 um, or the like, and certainly may be another value within the foregoing range, which is not limited herein.

In an optional technical solution of this application, a ratio of the median particle size $R_2$ of the stabilized lithium metal powder to the median particle size $R_1$ of the active material satisfies: $0.01 \leq R_2/R_1 \leq 1$; and a value of $R_2/R_1$ may specifically be 0.01, 0.02, 0.03, 0.05, 0.1, 0.3, 0.5, 0.7, 0.8, 1, or the like, and certainly may be another value within the foregoing range, which is not limited herein.

In an optional technical solution of this application, in Si2p spectrum obtained by analyzing the negative electrode active substance layer according to an X-ray diffraction method, a binding energy peak of Si2p includes at least one of 101.4 eV±0.3 eV, 102.2 eV±0.3 eV, 103.1 eV±0.3 eV, or 104.40 eV±0.3 eV, which means that each binding energy peak corresponds to one existence form of Si.

In an optional technical solution of this application, a binding energy peak of Li obtained by analyzing the negative electrode active substance layer according to the X-ray diffraction method is 55.6 eV±0.3 eV.

Figure 2:
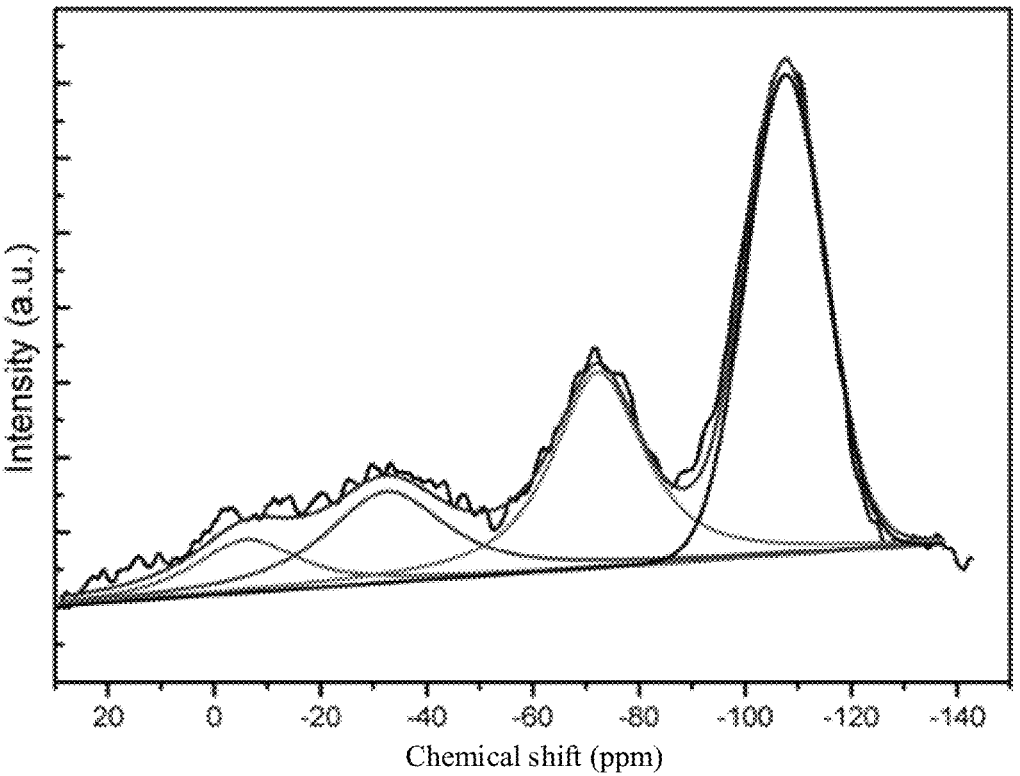
FIG. 2 is a solid-state nuclear magnetic spectroscopy of a negative electrode plate in an electrochemical apparatus according to an embodiment of this application.

In an optional technical solution of this application, as shown in FIG. 2, chemical shift values of Si are obtained by analyzing the negative electrode active substance layer according to a solid-state nuclear magnetic resonance technology. The chemical shift values of Si include −5 ppm±1 ppm, −35 ppm±1 ppm, −75 ppm±1 ppm, and −100 ppm±1 ppm, and a peak width K at half height of the chemical shift peak of Si at −5 ppm±1 ppm satisfies the following relationship: 7 ppm<K<28 ppm.

In an optional technical solution of this application, when the electrochemical apparatus is in a fully charged state, the negative electrode active substance layer has a diffraction peak of $Li_{15}Si_4$ according to the X-ray diffraction method.

In an optional technical solution of this application, in a transmission electron microscope (TEM) high-definition image, $Li_{15}Si_4$ crystalline grains, $Li_2SiO_3$ crystalline grains, and $Li_2Si_2O_5$ crystalline grains can be seen, an interplanar spacing of a $Li_{15}Si_4$ crystalline grain is approximately 0.2 nm, an interplanar spacing of a $Li_2SiO_3$ crystalline grain is approximately 0.27 nm, and an interplanar spacing of a $Li_2Si_2O_5$ crystalline grain is approximately 0.196 nm.

In an optional technical solution of this application, the negative electrode active substance layer includes a binder, and the binder can enhance binding between particles of the negative electrode active material, and binding between the negative electrode active material and the negative electrode current collector. The binder includes at least one of polyacrylate, polyimide, polyamide, polyamideimide, polyfluoroethylene, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, or potassium hydroxymethyl cellulose, which is not limited herein.

In an optional technical solution of this application, the negative electrode active substance layer further includes a conductive material, and the conductive material includes natural graphite, artificial graphite, carbon black, acetylene black, Ketjen black, carbon fiber, metal powder, metal fiber, copper, nickel, aluminum, silver, polyphenylene derivatives, or the like, which is not limited herein.

In an optional technical solution of this application, a value of a resistance of the negative electrode active substance layer ranges from 0.2Ω to 1.0Ω, specifically may be 0.2 Ω, 0.3 Ω, 0.5 Ω, 0.6 Ω, 0.8 Ω, 0.9 Ω, 1Ω, or the like, and certainly may be another value within the foregoing range.

In an optional technical solution of this application, a powder electrical conductivity of the negative electrode active substance layer ranges from 2.0 S/cm to 30.0 S/cm, specifically may be 2.0 S/cm, 5.0 S/cm, 8.0 S/cm, 10 S/cm, 12 S/cm, 15 S/cm, 18 S/cm, 20 S/cm, 25 S/cm, 30 S/cm, or the like, and certainly may be another value within the foregoing range.

In an optional technical solution of this application, the electrochemical apparatus further includes a positive electrode plate, where the positive electrode plate includes a positive electrode current collector and a positive electrode active substance layer disposed on the positive electrode current collector.

In an optional technical solution of this application, the positive electrode active material includes at least one of lithium cobaltate ($LiCoO_2$), a lithium-nickel-cobalt-manganese ternary material, lithium iron phosphate, lithium iron manganese phosphate, or lithium manganate.

In an optional technical solution of this application, the positive electrode active substance layer further includes a binder and a conductive material. It may be understood that the binder enhances binding between particles of the positive electrode active material, and binding between the positive electrode active material and the current collector.

Specifically, the binder includes at least one of polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrenebutadiene rubber, acrylic styrene-butadiene rubber, epoxy resin, or nylon.

Specifically, the conductive material includes a carbon-based material, a metal-based material, a conductive polymer, and a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powder, metal fiber, copper, nickel, aluminum, or silver. In some embodiments, the conductive polymer is a polyphenylene derivative.

In an optional technical solution of this application, the positive electrode current collector includes, but is not limited to, aluminum foil.

In an optional technical solution of this application, the electrochemical apparatus further includes an electrolyte, and the electrolyte includes an organic solvent, a lithium salt, and an additive.

The organic solvent of the electrolyte according to this application may be any organic solvent that is known in the prior art and that may be used as a solvent of the electrolyte. An electrolyte salt used in the electrolyte according to this application is not limited, and may be any electrolyte salt known in the prior art. The additive of the electrolyte according to this application may be any additive that is known in the prior art and that may be used as an additive of the electrolyte.

In a specific embodiment, the organic solvent includes, but is not limited to: ethylene carbonate (EC), propylene carbonate (PC), diethyl carbonate (DEC), ethyl methyl carbonate (EMC), dimethyl carbonate (DMC), propylene carbonate, propyl propionate, or ethyl propionate.

In a specific embodiment, the lithium salt includes at least one of an organic lithium salt or an inorganic lithium salt.

In a specific embodiment, the lithium salt includes, but is not limited to: lithium hexafluorophosphate ($LiPF_6$), lithium tetrafluoroborate ($LiBF_4$), lithium difluorophosphate ($LiPO_2F_2$), lithium bistrifluoromethanesulfonimide LiN $(CF_3SO_2)_2$(LiTFSI), lithium bis(fluorosulfonyl)imide Li(N $(SO_2F)_2$)(LiFSI), lithium bis(oxalate) borate $LiB(C_2O_4)_2$ (LiBOB) or lithium difluoro(oxalato)borate $LiBF_2(C_2O_4)$ (LiDFOB).

In a specific embodiment, a concentration of the lithium salt in the electrolyte may range from 0.5 mol/L to 3 mol/L.

In an optional technical solution of this application, the electrochemical apparatus of this application includes, but is not limited to: all kinds of primary batteries, secondary batteries, fuel cells, solar cells or capacitors.

In a specific embodiment, the electrochemical apparatus is a lithium secondary battery, where the lithium secondary battery includes, but is not limited to: a lithium metal secondary battery, a lithium-ion battery, a lithium polymer secondary battery or a lithium-ion polymer secondary battery.

According to a second aspect, an embodiment of this application further provides an electronic apparatus, where the electronic apparatus includes the electrochemical apparatuses according to the foregoing fourth aspect.

In an optional technical solution of this application, the electronic apparatus includes, but is not limited to: a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

The following uses a lithium-ion battery as an example and describes preparation of a lithium-ion battery with reference to specific embodiments. A person skilled in the art may understand that a preparation method described in this application is only an example, and that all other suitable preparation methods shall fall within the scope of this application.

(1) Preparation of a Negative Electrode Plate

A SiOC material and graphite was mixed at a specified ratio (a mass ratio is between 5:95 and 45:55) and stirred, and the mixed powder, a conductive agent acetylene black, and lithium polyacrylate were mixed at a ratio of 95:1.2:3.8 in a deionized water solvent system and stirred for 4 hours to 36 hours, to obtain a well-mixed slurry.

The slurry was applied on copper foil and dried under vacuum at 130° C., to obtain an initial electrode plate.

Stabilized metal lithium powder was dissolved and dispersed uniformly in toluene, where a mass ratio of the stabilized metal lithium powder to the active material (SiOC+graphite) ranged from 1.99 to 9; under the protection of argon gas, the uniformly mixed toluene solution of the stabilized metal lithium powder was sprayed by an air spray gun onto a surface of the initial electrode plate, and the electrode plate was left standing for 4 hours to 36 hours; and then the electrode plate was cold-pressed.

The operations of spraying the toluene solution of the stabilized metal lithium powder and the cold pressing were repeated 1 to 7 times to obtain a SiOC/stabilized metal lithium powder negative electrode plate.

In Examples 1 to 16 and Comparative Examples 1 to 6, the preparation was performed according to the foregoing method. For parameters, refer to Table 1.

(2) Preparation of a Positive Electrode Plate

A positive electrode active material, conductive carbon black, and a binder polyvinylidene fluoride were mixed at a weight ratio of 95:2.5:2.5, N-methylpyrrolidone (NMP) was added, and the mixture was stirred well under the action of a vacuum mixer to obtain a positive electrode slurry. The positive electrode slurry was uniformly applied on the positive electrode current collector aluminum foil, and a positive electrode plate was obtained after processes such as drying, cold-pressing, cutting, slitting, and tab welding were performed.

(3) Electrolyte

In a glove box under a dry argon atmosphere, $LiPF_6$ was added into and mixed uniformly with a solvent obtained by mixing propylene carbonate (PC) and ethylene carbonate (EC) (at a weight ratio of 1:1), to obtain an electrolyte, where a concentration of $LiPF_6$ was 1 mol/L.

(4) Separator

A porous polyethylene polymeric film was used as a separator.

(5) Preparation of a Lithium-Ion Battery

The positive electrode plate, the separator, and the negative electrode plate were stacked in order, so that the separator was located between the positive electrode plate and the negative electrode plate for separation, and then the stack was wound to obtain a bare cell; after tabs were welded, the bare cell was placed in an outer packaging aluminum foil plastic film; and the prepared electrolyte was injected into the dried bare cell, and a lithium-ion battery was obtained after processes such as vacuum packaging, standing, formation, shaping, and capacity testing were performed.

2. Performance Test for Lithium-Ion Battery (1) XPS Test

The XPS test device was ESCLAB 250Xi from Thermo Fisher Scientific, with an Al target as an excitation source, a power of 250 W, and a vacuum degree of more than $10^{-9}$ Pa. A binding energy peak of Si2p and a binding energy peak of Li were determined through the XPS test.

(2) TEM Test

Transmission electron microscope characterization was tested on a JEOL JEM-2010 transmission electron microscope, under a working voltage of 200 kV.

(3) Solid-State Nuclear Magnetic Test $^{29}$Si SNMR spectra were measured on an AVANCE III 400 WB wide-bore solid-state nuclear magnetic resonance spectrometer, with a spinning rate of 8 kHz corresponding to $^{29}$Si.

(4) Particle Size Test

About 0.02 g of powder sample was added into a 50 ml clean beaker, about 20 ml deionized water was added, a few drops of a 1% surfactant were added to make the powder fully dispersed in the water, the powder was subjected to ultrasound for 5 min in a 120 W ultrasonic cleaning machine, and a MasterSizer 2000 was used to test the particle size distribution.

(5) Resistance Test for Negative Electrode Active Substance Layer

The resistance of the negative electrode active substance layer was measured by using a four-probe method. The instrument used for the four-probe method was a precision direct current voltage and current source (SB118). Four copper plates with dimensions of 1.5 cm (length)×1 cm (width)×2 mm (thickness) were fixed in a line at equal distances. A distance between the two copper plates in the middle is L (1 cm to 2 cm), and the base material for fixing the copper plates was an insulating material. During the test, lower end faces of the four copper plates were pressed on a to-be-measured negative electrode (the pressure was 3000 Kg) for 60 seconds, a direct current I is connected to the copper plates at two ends, a voltage V on the two copper plates in the middle was measured, I and V were read three times, and an average value of I and an average value of V were calculated and recorded as Ia and Va respectively, and then a value of Va/Ia was the resistance of the negative electrode active substance layer at the test site. Twelve points were selected in each negative electrode plate for test, and an average value therefrom was obtained.

(6) Powder Electrical Conductivity Test

A resistivity tester (ST-2255A from Suzhou Jingge Electronics Co., Ltd.) was used. 5 g of powder sample was taken and pressed by using an electronic press at a constant pressure of 5000±2 kg for 15 to 25 seconds, then the sample was placed between electrodes of the tester. Given a height h (cm) of the sample, a voltage U across two ends, a current I, a resistance R (KΩ), and an area $S=3.14$ $cm^2$ of the pressed powder, the powder electronic conductivity was calculated according to the formula $\delta = h/(S \ast R)/1000$ in S/m.

(7) First-Cycle Coulombic Efficiency Test and Cyclic Swelling Rate Test

An initial thickness of a lithium-ion battery was measured by a micrometer and recorded as H0. The lithium-ion battery was charged to the charge cut-off voltage at 25° C. at a rate of 0.5 C, then charged to 0.025 C at a constant voltage, and then discharged to the discharge cut-off voltage at a rate of 0.5 C, so as to get a first-cycle charge capacity and a first-cycle discharge capacity. First-cycle coulombic efficiency=first-cycle discharge capacity/first-cycle charge capacity.

The foregoing charge and discharge were repeated for 400 cycles, and a thickness of the lithium-ion battery in this case was measured by the micrometer and recorded as H1. Swelling rate after 400 cycles=(H1−H0)/H0×100%.

The cycling capacity retention rate is the discharge capacity after the 400th cycle divided by the first-cycle discharge capacity.

For preparation process parameters of the negative electrode plates of Examples 1 to 16 and the negative electrode plates of Comparative Examples 1 to 6 that are prepared according to the foregoing method, refer to Table 1. For performance parameters of the prepared negative electrode plates, refer to Table 2. For performance test results of lithium batteries prepared by using the negative electrode plates, refer to Table 3.

TABLE 1

Preparation process parameters of negative electrode plates

| Sample | Mass of SiOC material (g) | Type of graphite | Mass of graphite (g) | Stirring duration (h) | Standing duration (h) | Number of repetitions | Mass of stabilized lithium metal powder (mg) | Thickness of electrode plate (um) | $D_1$ (um) | $D_1/D_2$ |
|---|---|---|---|---|---|---|---|---|---|---|
| Example 1 | 50 | Artificial graphite | 950 | 12 | 12 | 5 | 348 | 110.2 | 100 | 10 |
| Example 2 | 100 | Artificial graphite | 900 | 12 | 12 | 5 | 348 | 110.2 | 100 | 10 |
| Example 3 | 150 | Artificial graphite | 850 | 12 | 12 | 5 | 348 | 110.2 | 100 | 10 |
| Example 4 | 450 | Artificial graphite | 550 | 12 | 12 | 5 | 348 | 110.2 | 100 | 10 |
| Example 5 | 150 | Artificial graphite | 850 | 4 | 12 | 5 | 348 | 110.2 | 100 | 10 |
| Example 6 | 150 | Artificial graphite | 850 | 24 | 12 | 5 | 348 | 110.2 | 100 | 10 |
| Example 7 | 150 | Artificial graphite | 850 | 36 | 12 | 5 | 348 | 110.2 | 100 | 10 |
| Example 8 | 150 | Artificial graphite | 850 | 12 | 4 | 5 | 348 | 110.2 | 100 | 10 |
| Example 9 | 150 | Artificial graphite | 850 | 12 | 24 | 5 | 348 | 110.2 | 100 | 10 |
| Example 10 | 150 | Artificial graphite | 850 | 12 | 36 | 5 | 348 | 110.2 | 100 | 10 |
| Example 11 | 150 | Artificial graphite | 850 | 12 | 12 | 1 | 72 | 90.1 | 88 | 2 |
| Example 12 | 150 | Artificial graphite | 850 | 12 | 12 | 3 | 221 | 100.3 | 95 | 5 |
| Example 13 | 150 | Artificial graphite | 850 | 12 | 12 | 7 | 459 | 120.6 | 100 | 20 |
| Example 14 | 150 | Artificial graphite | 850 | 12 | 12 | 5 | 348 | 110.2 | 100 | 10 |
| Example 15 | 150 | Artificial graphite | 850 | 12 | 12 | 5 | 348 | 110.2 | 100 | 10 |
| Example 16 | 150 | Artificial graphite | 850 | 12 | 12 | 5 | 348 | 110.2 | 100 | 10 |
| Comparative Example 1 | 150 | Artificial graphite | 850 | 12 | 12 | 0 | 0 | 80.2 | 80.2 | / |
| Comparative Example 2 | 150 | Artificial graphite | 850 | 4 | 12 | 0 | 0 | 80.2 | 80.2 | / |
| Comparative Example 3 | 150 | Artificial graphite | 850 | 24 | 12 | 0 | 0 | 80.2 | 80.2 | / |
| Comparative Example 4 | 150 | Artificial graphite | 850 | 36 | 12 | 0 | 0 | 80.2 | 80.2 | / |
| Comparative Example 5 | 50 | Artificial graphite | 950 | 12 | 12 | 0 | 0 | 80.2 | 80.2 | / |
| Comparative Example 6 | 450 | Artificial graphite | 550 | 12 | 12 | 0 | 0 | 80.2 | 80.2 | / |

TABLE 2

Performance parameters of negative electrode plates

| Sample | Peak width at half height at −5 ppm in SNMR (ppm) | Median particle size of powder (SiOC + graphite) $R_1$ (um) | $R_2/R_1$ | Powder electrical conductivity (S/cm) | Resistance (Ω) | Gram capacity of electrode plate (mAh/g) | First-cycle coulombic efficiency of electrode plate (%) |
|---|---|---|---|---|---|---|---|
| Example 1 | 50 | 12 | 0.2 | 10 | 0.63 | 400 | 99.7 |
| Example 2 | 100 | 12 | 0.2 | 10 | 0.62 | 448 | 95.2 |
| Example 3 | 150 | 12 | 0.2 | 10 | 0.63 | 500 | 93.2 |
| Example 4 | 450 | 12 | 0.2 | 10 | 0.58 | 680 | 89.2 |
| Example 5 | 150 | 12 | 0.2 | 10 | 0.53 | 500 | 99.7 |
| Example 6 | 150 | 12 | 0.2 | 10 | 0.5 | 500 | 99.7 |
| Example 7 | 150 | 12 | 0.2 | 10 | 0.47 | 500 | 99.7 |
| Example 8 | 150 | 12 | 0.2 | 10 | 0.44 | 500 | 99.7 |
| Example 9 | 150 | 12 | 0.2 | 10 | 0.40 | 500 | 99.7 |
| Example 10 | 150 | 12 | 0.2 | 10 | 0.25 | 500 | 99.7 |
| Example 11 | 150 | 12 | 0.2 | 10 | 0.48 | 500 | 90.7 |
| Example 12 | 150 | 12 | 0.2 | 10 | 0.47 | 500 | 92.7 |
| Example 13 | 150 | 12 | 0.2 | 10 | 0.47 | 500 | 93.2 |
| Example 14 | 150 | 0.6 | 0.01 | 10 | 0.52 | 500 | 92.4 |

TABLE 2-continued

Performance parameters of negative electrode plates

| Sample | Peak width at half height at −5 ppm in SNMR (ppm) | Median particle size of powder (SiOC + graphite) $R_1$ (um) | $R_2/R_1$ | Powder electrical conductivity (S/cm) | Resistance (Ω) | Gram capacity of electrode plate (mAh/g) | First-cycle coulombic efficiency of electrode plate (%) |
|---|---|---|---|---|---|---|---|
| Example 15 | 150 | 2.9 | 0.5 | 10 | 0.49 | 500 | 93.6 |
| Example 16 | 150 | 5.9 | 1 | 10 | 0.50 | 500 | 92.5 |
| Comparative Example 1 | 150 | 12 | 0.2 | 10 | 1.32 | 500 | 70.8 |
| Comparative Example 2 | 150 | 12 | 0.2 | 10 | 0.46 | 500 | 70.8 |
| Comparative Example 3 | 150 | 12 | 0.2 | 10 | 0.46 | 500 | 70.8 |
| Comparative Example 4 | 150 | 12 | 0.2 | 10 | 0.91 | 500 | 70.8 |
| Comparative Example 5 | 50 | 12 | 0.2 | 10 | 0.52 | 400 | 89.2 |
| Comparative Example 6 | 450 | 12 | 0.2 | 10 | 0.15 | 680 | 60.5 |

TABLE 3

Performance parameters of lithium batteries

| Sample | First-cycle coulombic efficiency of full battery (%) | Capacity retention rate after 400 cycles at 25° C. (%) | Cell swelling Rate after 400 cycles at 25° C. (%) |
|---|---|---|---|
| Example 1 | 92.8 | 90.1 | 7.4 |
| Example 2 | 92.7 | 87.9 | 7.8 |
| Example 3 | 92.9 | 93.3 | 4.5 |
| Example 4 | 92 | 82.3 | 6.8 |
| Example 5 | 92.8 | 88.3 | 7.3 |
| Example 6 | 92.1 | 88.7 | 8.5 |
| Example 7 | 92.9 | 89.2 | 7.0 |
| Example 8 | 92 | 88.3 | 7.4 |
| Example 9 | 92.9 | 88.7 | 7.8 |
| Example 10 | 92.8 | 88.9 | 8.0 |
| Example 11 | 70 | 65.6 | 8.2 |
| Example 12 | 85 | 66 | 8.5 |
| Example 13 | 92.9 | 85 | 8.6 |
| Example 14 | 89.9 | 86.7 | 8.2 |
| Example 15 | 90.3 | 88.5 | 6.8 |
| Example 16 | 89.6 | 87.1 | 6.4 |
| Comparative Example 1 | 73 | 65.2 | 5.8 |
| Comparative Example 2 | 72.6 | 65.2 | 9.8 |
| Comparative Example 3 | 73.1 | 65.2 | 8.5 |
| Comparative Example 4 | 72.9 | 65.2 | 8.6 |
| Comparative Example 5 | 63 | 54.4 | 5.8 |
| Comparative Example 6 | 52 | 48.8 | 9.8 |

Figure 3:
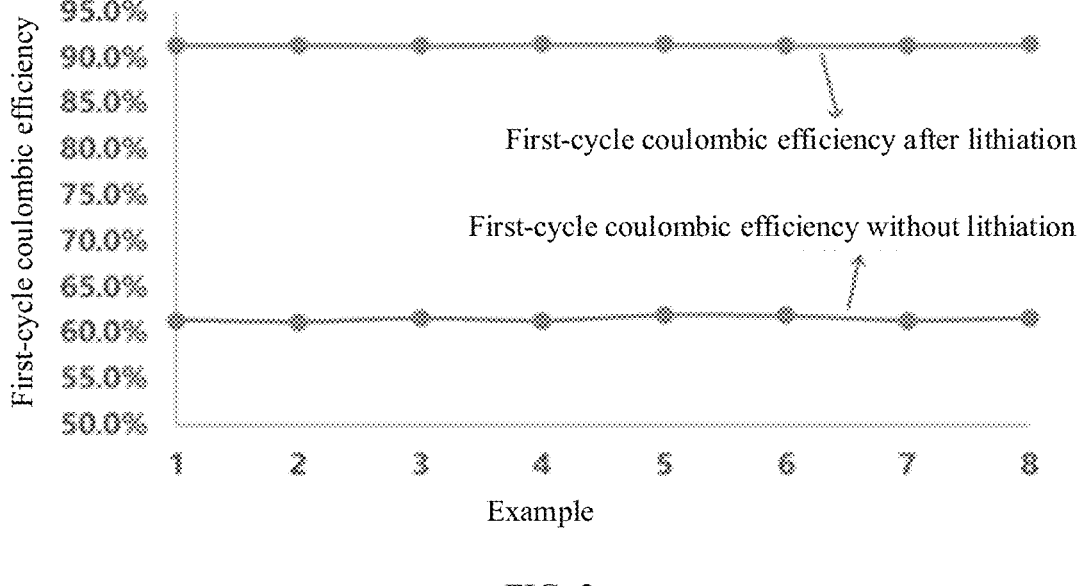
FIG. 3 is a comparison diagram of first-cycle coulombic efficiencies before and after a lithium-containing layer is added to a negative electrode plate according to an embodiment of this application.

As shown in FIG. 3, the first-cycle coulombic efficiencies of the negative electrode plates of Examples 1 to 8 before and after a lithium-containing layer was applied were significantly improved. The lithium-containing layer could be applied on a surface of the active material layer to improve the first-cycle coulombic efficiency of the battery.

Comparisons of test data of Examples 1 to 4 show the influence of ratios of different SiOC materials to graphite on performance of the materials and cells. In the case of the same preparation process, the same amount of stabilized lithium metal powder, and the same thickness of the electrode plates, as the SiOC material in the active material increases, the gram capacity of the negative electrode plate increased, but the increase of the SiOC material consumed more active lithium ions, so that the first-cycle coulombic efficiency of the negative electrode plate decreased.

Comparisons of test data of Examples 3, and 5 to 7 show the influence of different stirring durations during preparation of negative electrode plates on the performance of the materials and cells. In the case that other influencing factors remained unchanged, the stirring duration controlled to be within 4 hours to 36 hours allowed the materials in the negative electrode slurry to be mixed well. Therefore, different stirring durations had little influence on the performance of the negative electrode plates and cells.

Comparisons of test data of Examples 3, and 8 to 10 show the influence of different standing durations during preparation of negative electrode plates on the performance of the materials and cells. In the case that other influencing factors remained unchanged, the standing duration controlled to be within 4 hours to 36 hours allowed the stabilized metal lithium powder to be stably on the active material layer. Therefore, different standing durations had little influence on the performance of the negative electrode plates and cells.

Comparisons of test data of Examples 3, and 11 to 13 show the influence of times of spraying toluene solution of the stabilized metal lithium powder during preparation of negative electrode plates on the performance of the materials and cells. In the case that other influencing factors remained unchanged, the number of times of spraying the toluene solution of the stabilized metal lithium powder was controlled to be 1 to 7. As the number of spraying operations increases, the amount of the stabilized lithium metal powder on the surface of the active material layer increased, and the thickness of the electrode plate also increased, so that the stabilized lithium metal powder could produce more active lithium ions during contact with the electrolyte. Therefore, the first-cycle coulombic efficiency of the electrode plate had also been improved, and both the first-cycle coulombic efficiency and the cycling retention rate of the battery had been improved.

Comparisons of test data of Examples 3, and 14 to 16 show the influence of a ratio of the median particle size of the stabilized metal lithium powder to the median particle size of the active material during preparation of negative electrode plates on the performance of the materials and cells. In the case that other influencing factors remained unchanged, a larger ratio of the median particle size of the stabilized metal lithium powder to the median particle size of the active material meant a smaller median particle size of the active material, and the swelling rate of the active material during cycling was reduced; and a smaller ratio of the median particle size of the stabilized metal lithium powder to the median particle size of the active material meant a larger median particle size of the active material, and the swelling rate of the active material during cycling was increased. Therefore, the ratio of the median particle size of the stabilized metal lithium powder to the median particle size of the active material needs to be controlled to improve cycling stability of the battery.

Although this application is disclosed above with preferred embodiments, they are not intended to limit the claims. Any person skilled in the art can make several possible changes and modifications without departing from the concept of this application. Therefore, the protection scope of this application shall be subject to the scope demarcated by the claims of this application.

What is claimed is:

1. An electrochemical apparatus, comprising:
a positive electrode plate and a negative electrode plate, wherein the negative electrode plate comprises a negative electrode current collector and a negative electrode active substance layer disposed on a surface of the negative electrode current collector,
wherein
the negative electrode active substance layer comprises an active material layer and a lithium-containing layer provided on a surface of the active material layer;
the active material layer comprises a SiOC material and graphite;
the lithium-containing layer comprises stabilized lithium metal powder;
a mass of a sum of the SiOC material and the graphite in the active material layer is x gram, a mass of the stabilized lithium metal powder in the lithium-containing layer is y milligram, and a ratio of x/y ranges from 2.5 to 4.5;
a mass ratio of the SiOC material to the graphite ranges from 5:95 to 15:85; and
a ratio of a thickness $D_1$ of the active material layer to a thickness $D_2$ of the lithium-containing layer satisfies: $5 \leq D_1/D_2 \leq 20$.

2. The electrochemical apparatus according to claim 1, wherein in Si2p spectrum obtained by analyzing the negative electrode active substance layer according to an X-ray diffraction method, a binding energy peak of Si2p comprises at least one of 101.4 eV±0.3 eV, 102.2 eV±0.3 eV, 103.1 eV±0.3 eV, or 104.40 eV±0.3 eV.

3. The electrochemical apparatus according to claim 1, wherein a binding energy peak of Li obtained by analyzing the negative electrode active substance layer according to the X-ray diffraction method is 55.6 eV±0.3 eV.

4. The electrochemical apparatus according to claim 1, wherein by analyzing the negative electrode active substance layer according to the X-ray diffraction method, the negative electrode active substance layer has at least one of a $Li_{22}Si$ diffraction peak, a $Li_{22}Ge$ diffraction peak, a $Li_{22}Sn$ diffraction peak, a $Li_2O$ diffraction peak, a $Li_2SiO_3$ diffraction peak, or a $Li_2Si_2O_5$ diffraction peak.

5. The electrochemical apparatus according to claim 1, wherein chemical shift values of Si obtained by analyzing the negative electrode active substance layer according to a solid-state nuclear magnetic resonance technology comprise −5 ppm±1 ppm, −35 ppm±1 ppm, −75 ppm±1 ppm, and −100 ppm±1 ppm, and a peak width K at a half height of the chemical shift peak of Si at −5 ppm±1 ppm satisfies the following relationship: 7 ppm<K<28 ppm.

6. The electrochemical apparatus according to claim 1, wherein a median particle size of a mixed powder of the SiOC material and graphite is $R_1$ μm, and $R_1$ ranges from 0.01 to 50.

7. The electrochemical apparatus according to claim 1, wherein a median particle size of the stabilized lithium metal powder is $R_2$ μm, and $R_2$ ranges from 0.1 to 20.

8. The electrochemical apparatus according to claim 1, wherein a thickness of the active material layer is $D_1$ μm, and $D_1$ ranges from 40 to 150.

9. The electrochemical apparatus according to claim 1, wherein a thickness of the lithium-containing layer is $D_2$ μm, and $D_2$ ranges from 2 to 20.

10. The electrochemical apparatus according to claim 1, wherein when the electrochemical apparatus is in a fully charged state, the negative electrode active substance layer has a diffraction peak of $Li_{15}Si_4$ according to the X-ray diffraction method.

11. The electrochemical apparatus according to claim 1, wherein a ratio of a median particle size $R_2$ of the stabilized lithium metal powder to a median particle size $R_1$ of a mixed powder of the SiOC material and graphite satisfies: $0.01 \leq R_2/R_1 \leq 1$.

12. The electrochemical apparatus according to claim 1, wherein the ratio of a thickness $D_1$ of the active material layer to the thickness $D_2$ of the lithium-containing layer satisfies: $8 \leq D_1/D_2 \leq 20$.

13. The electrochemical apparatus according to claim 1, wherein a mass ratio of total mass of the SiOC material and the graphite to mass of the stabilized lithium metal powder ranges from 1.99 to 9.

14. The electrochemical apparatus according to claim 1, wherein a powder electrical conductivity of the negative electrode active substance layer ranges from 2.0 S/cm to 30.0 S/cm.

15. The electrochemical apparatus according to claim 1, wherein a resistance of the negative electrode active substance layer ranges from 0.2 2 to 1.02.

16. The electrochemical apparatus according to claim 1, wherein the negative electrode active substance layer further comprises a binder; and the binder comprises at least one of polyacrylate, polyimide, polyamide, polyamideimide, polyfluoroethylene, styrene butadiene rubber, sodium alginate, polyvinyl alcohol, polytetrafluoroethylene, polyacrylonitrile, sodium carboxymethyl cellulose, potassium carboxymethyl cellulose, sodium hydroxymethyl cellulose, or potassium hydroxymethyl cellulose.

17. The electrochemical apparatus according to claim 1, wherein the electrochemical apparatus further comprises an electrolyte, and the electrolyte comprises an organic solvent and a lithium salt;
the organic solvent comprises at least one of ethylene carbonate, propylene carbonate, diethyl carbonate, ethyl methyl carbonate, dimethyl carbonate, propyl propionate, or ethyl propionate; and/or
the lithium salt comprises at least one of lithium hexafluorophosphate, lithium tetrafluoroborate, lithium difluorophosphate, lithium bistrifluoromethanesulfonimide, lithium bis(fluorosulfonyl)imide, lithium bis(oxalate) borate, or lithium difluorooxalate.

18. An electronic apparatus, wherein the electronic apparatus comprises the electrochemical apparatus according to claim 1.

19. The electrochemical apparatus according to claim 1, wherein the stabilized lithium metal powder includes element Ge or element Sn.

* * * * *